United States Patent
Schulte et al.

(10) Patent No.: US 7,428,567 B2
(45) Date of Patent: Sep. 23, 2008

(54) ARITHMETIC UNIT FOR ADDITION OR SUBTRACTION WITH PRELIMINARY SATURATION DETECTION

(75) Inventors: Michael J. Schulte, Madison, WI (US); Erdem Hokenek, Yorktown Heights, NY (US); Pablo I. Balzola, Nanuet, NY (US); C. John Glossner, Carmel, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 925 days.

(21) Appl. No.: 10/892,686

(22) Filed: Jul. 16, 2004

(65) Prior Publication Data

US 2005/0060359 A1    Mar. 17, 2005

Related U.S. Application Data

(60) Provisional application No. 60/489,347, filed on Jul. 23, 2003.

(51) Int. Cl.
*G06F 7/50* (2006.01)
(52) U.S. Cl. .................... 708/670; 708/518; 708/552
(58) Field of Classification Search ................. 708/670, 708/552–553, 518
See application file for complete search history.

(56) References Cited

U.S. PATENT DOCUMENTS

| | | | |
|---|---|---|---|
| 5,081,607 A | * | 1/1992 | Bates et al. ............... 708/710 |
| 5,745,397 A | | 4/1998 | Nadehara |
| 5,889,689 A | * | 3/1999 | Alidina et al. ............... 708/552 |
| 5,959,874 A | * | 9/1999 | Lin et al. ..................... 708/700 |
| 6,151,616 A | | 11/2000 | Mahurin |
| 6,301,600 B1 | | 10/2001 | Petro et al. |
| 2002/0188640 A1 | | 12/2002 | Catherwood |

FOREIGN PATENT DOCUMENTS

| | | |
|---|---|---|
| EP | 0 780 759 A | 6/1997 |
| JP | 07 097312 B2 | 10/1995 |
| WO | PCT/US2004/023431 | 12/2004 |

* cited by examiner

*Primary Examiner*—Tan V Mai
(74) *Attorney, Agent, or Firm*—Barnes & Thornburg LLP

(57) ABSTRACT

An arithmetic unit for performing an arithmetic operation on at least first and second input operands, each of the input operands being separable into a first portion and a second portion, such as respective less significant and more significant portions. The arithmetic unit comprises first arithmetic circuitry, second arithmetic circuitry, selection circuitry and saturation circuitry. The first arithmetic circuitry, which may comprise a carry-propagate adder, processes the first portions of the input operands to generate at least a temporary sum and a carry output. The second arithmetic circuitry, which may comprise a dual adder and a preliminary saturation detector, processes the second portions of the input operands to generate one or more temporary sums and a number of saturation flags. The selection circuitry is configured to select one or more of the outputs of the second arithmetic circuitry based on the carry output of the first arithmetic circuitry. The saturation circuitry has inputs coupled to corresponding outputs of the first arithmetic circuitry and the selection circuitry, and is configured to generate a result of the arithmetic operation.

25 Claims, 5 Drawing Sheets

FIG. 1

| 1 SIGN BIT | g GUARD BITS | f FRACTION BITS | MIXED NUMBER |

| 1 SIGN BIT | f FRACTION BITS | FRACTION |

| g EXTEND BITS | 1 SIGN BIT | f FRACTION BITS | SIGN-EXTEND FRACTION |

FIG. 2

POSITIVE OVERFLOW AND SATURATION

```
   0000.1100 = 0.75     (MIXED-NUMBER INPUT A)
 + 0000.1000 = 0.50     (MIXED-NUMBER INPUT B)
 = 0001.0100 = 1.25     (MIX-NUMBER TEMPORARY SUM T)
   0000.1111 = 0.9375   (SIGN-EXTENDED FRACTIONAL SUM S)
```

NEGATIVE OVERFLOW AND SATURATION

```
   1111.1100 = -0.25    (MIXED-NUMBER INPUT A)
 + 1110.0000 = -2.00    (MIXED-NUMBER INPUT B)
 = 1101.1100 = -2.25    (MIX-NUMBER TEMPORARY SUM T)
   1111.0000 = -1.00    (SIGN-EXTENDED FRACTIONAL SUM S)
```

NO OVERFLOW AND SATURATION

```
   0001.1000 =  1.50    (MIXED-NUMBER INPUT A)
 + 1110.0000 = -2.00    (MIXED-NUMBER INPUT B)
 = 1111.1000 = -0.50    (MIX-NUMBER TEMPORARY SUM T)
   1111.1000 = -0.50    (SIGN-EXTENDED FRACTIONAL SUM S)
```

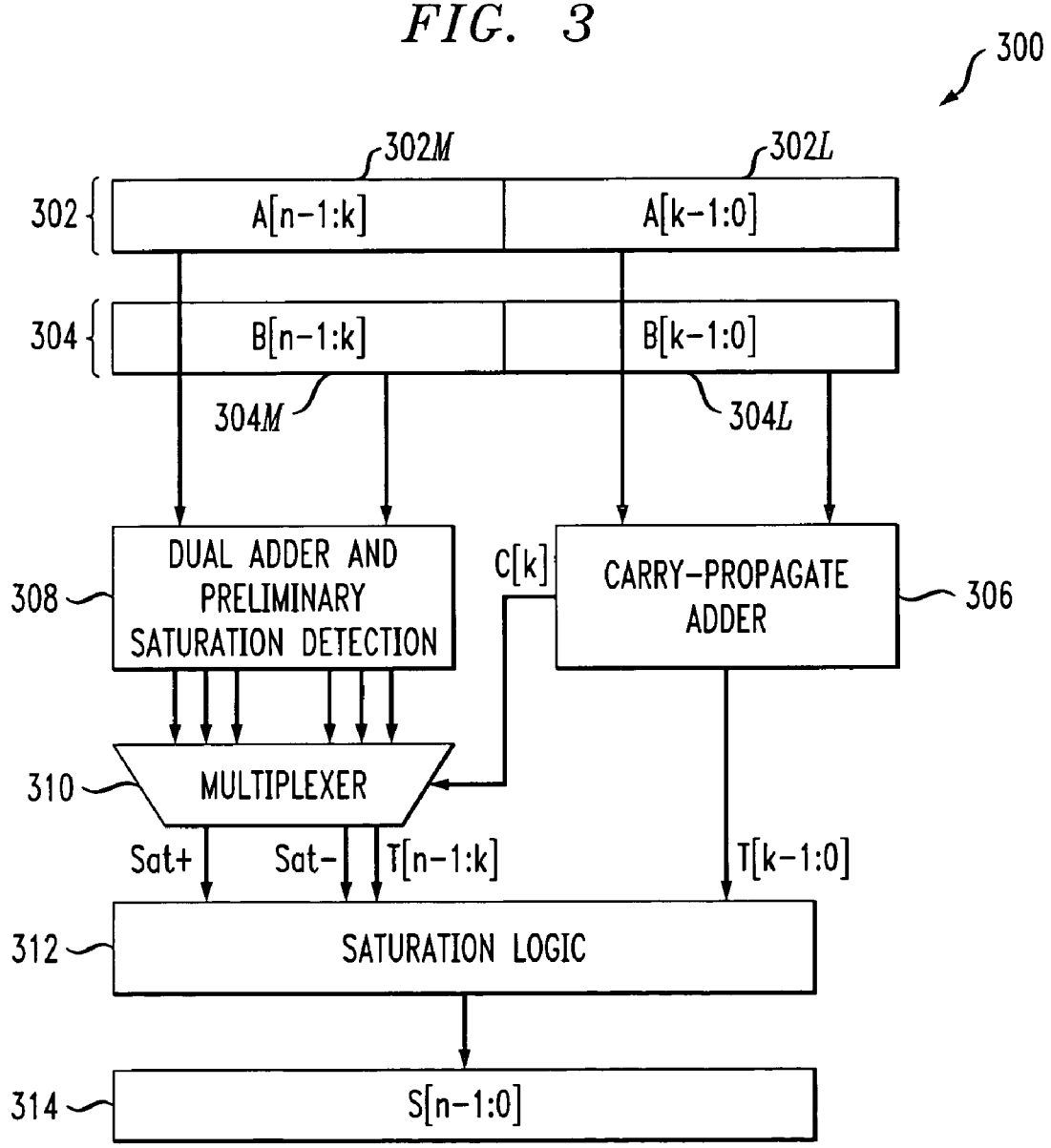

FIG. 4

POSITIVE OVERFLOW AND SATURATION

```
  00000.1100 = 0.75       (MIXED-NUMBER INPUT A, SIGN-EXTENDED ONE BIT)
+ 00000.1000 = 0.50       (MIXED-NUMBER INPUT B, SIGN-EXTENDED ONE BIT)
= 00001.0100 = 1.25       T_0[8:4] = 00000, T_1[8:4] = 00001, Sat+_0 = 0, Sat+_1 = 1
                          Sat-_0 = 0, Sat-_1 = 0, C[4] = 1, T[8:4] = 00001, Sat+ = 1, Sat- = 0
  0000.1111 = 0.9375      (SIGN-EXTENDED FRACTIONAL SUM S)
```

NEGATIVE OVERFLOW AND SATURATION

```
  11111.1100 = -0.25      (MIXED-NUMBER INPUT A, SIGN-EXTENDED ONE BIT)
+ 11110.0000 = -2.00      (MIXED-NUMBER INPUT B, SIGN-EXTENDED ONE BIT)
= 11101.1100 = -2.25      T_0[8:4] = 11101, T_1[8:4] = 11110, Sat+_0 = 0, Sat+_1 = 0
                          Sat-_0 = 1, Sat-_1 = 1, C[4] = 0, T[8:4] = 11101, Sat+ = 0, Sat- = 1
  1111.0000 = -1.00       (SIGN-EXTENDED FRACTIONAL SUM S)
```

NO OVERFLOW AND SATURATION

```
  00001.1000 =  1.50      (MIXED-NUMBER INPUT A, SIGN-EXTENDED ONE BIT)
+ 11110.0000 = -2.00      (MIXED-NUMBER INPUT B, SIGN-EXTENDED ONE BIT)
= 11111.1000 = -0.50      T_0[8:4] = 11111, T_1[8:4] = 00000, Sat+_0 = 0, Sat+_1 = 0
                          Sat-_0 = 0, Sat-_1 = 0, C[4] = 0, T[8:4] = 11111, Sat+ = 0, Sat- = 0
  1111.1000 = -0.50       (SIGN-EXTENDED FRACTIONAL SUM S)
```

US 7,428,567 B2

ARITHMETIC UNIT FOR ADDITION OR SUBTRACTION WITH PRELIMINARY SATURATION DETECTION

RELATED APPLICATION(S)

The present application claims the priority of U.S. Provisional Application Ser. No. 60/489,347, filed Jul. 23, 2003 in the name of M. J. Schulte et al. and entitled "Method and Apparatus for Two's Complement Addition with Fast Saturation," which is incorporated by reference herein.

FIELD OF THE INVENTION

The present invention relates generally to the field of digital data processors, and more particularly to arithmetic processing operations and associated processing circuitry for use in a digital signal processor (DSP) or other type of digital data processor.

BACKGROUND OF THE INVENTION

Many digital data processors, including most DSPs and multimedia processors, use binary fixed-point arithmetic, in which operations are performed on integers, fractions, or mixed numbers in unsigned or two's complement binary format. DSP and multimedia applications often require that the processor be configured to perform both saturating arithmetic and wrap-around arithmetic on numbers in a given binary format. In saturating arithmetic, computation results that are too large to be represented in a specified number format lead to an overflow condition, and are saturated to the most positive or most negative number. In wrap-around arithmetic, results that overflow are wrapped around, such that any digits that cannot fit into the specified number representation are simply discarded.

FIG. 1 illustrates three example binary number formats that are commonly used in digital processors.

The first format shown is a mixed-number format, which includes one sign bit, g guard bits, and f fraction bits. The guard bits are additional integer bits that are used to reduce the likelihood of overflow in intermediate calculations. The binary point is between the guard bits and fraction bits. A typical 40-bit mixed-number format for representing an operand includes one sign bit, eight guard bits and 31 fraction bits.

The second format is a fractional format, which includes one sign bit and f fraction bits, but no guard bits. The binary point in this particular format is between the sign bit and the fraction bits. A typical 32-bit fraction format for an operand includes one sign bit and 31 fraction bits.

The third format is a sign-extended fractional format, which includes g extend bits, one sign bit, and f fraction bits. The binary point is between the sign bit and the fraction bits, and the extend bits are identical to the sign bit. This format thus allows a saturated result in fractional format to be sign-extended so that the result has the same number of bits as the mixed-number format.

In a variety of applications, it is useful to perform operations on operands in a mixed-number format, fractional format or sign-extended fractional format, and produce saturated results that are in a mixed-number format, fractional format or sign-extended fractional format.

It is also useful to have a single adder or other arithmetic unit that can take inputs and produce results in the mixed-number format, fractional format or sign-extended fractional format.

There are a number of techniques known in the art for performing overflow detection and saturation with two's complement addition. For example, when input and result operands all use the same format, overflow is often detected by examining the sign bits of the input and result operands. If the input operands have the same sign and the sign of the result is different, then overflow has occurred and the result should be saturated; otherwise overflow is guaranteed not to have occurred. Another method for detecting this same condition is to examine the carries into and out of the sign bit. If the carry into the sign bit differs from the carry out of the sign bit, then overflow has occurred and the result should be saturated; otherwise overflow is guaranteed not to have occurred. Although these techniques work well when the input and result operands use the same format, they generally cannot be used when the input and result operands have different formats.

A straightforward mechanism for performing two's complement saturating addition when the input operands are in mixed-number format and the result operands are in fractional format or sign-extended fractional format involves producing a result in the mixed-number format and then examining that result and the sign bits of the input operands to determine if overflow has occurred and if the final result should be saturated. This can be accomplished by having one circuit that detects if overflow occurs in the mixed-number format and a second circuit that detects if the mixed-number result cannot be exactly represented in the fractional format. The first circuit can detect overflow by examining the sign bits of the input operands and the sign bit of the result, as described above. The second circuit can detect overflow by comparing the sign bit of the result with the guard bits of the result. If the sign bit differs from any of these guard bits, then overflow has occurred. Although this approach correctly detects overflow, it has the disadvantage that the guard bits of the result must be computed before it can be determined if overflow has occurred.

FIG. 2 shows a number of examples of two's complement addition for a case in which the input operands are in mixed-number format, and the final result is in sign-extended fractional format, with g=3 and f=4. The left side of each equation gives the two's complement value and the right side gives the decimal value.

In the first example, two positive numbers, 0.50 and 0.75, are added together. Since their sum, 1.25, cannot be exactly represented as a sign-extended fractional number, positive overflow occurs and the sum is saturated to the most positive number in the specified output format, which in this case is 0.9375.

In the second example, two negative numbers, −0.25 and −2.00, are added together. Since their sum, −2.25, cannot be exactly represented as a sign-extended fractional number, negative overflow occurs and the sum is saturated to the most negative number in the specified format, which in this case is −1.00.

In the third example, a positive number, 1.50, and a negative number, −2.00, are added together. Since their sum, −0.50, can be represented as a sign-extended fractional number, overflow does not occur and the final sum is not saturated.

As indicated above, conventional techniques for performing two's complement addition operations of the type shown in FIG. 2 are problematic in that those techniques either require the input operands to be in the same format as the result, or require computation of guard bits before overflow detection can begin.

Accordingly, a need exists for an improved arithmetic unit that is capable of performing addition or other operations in a digital data processor without the drawbacks of the above-described conventional techniques.

SUMMARY OF THE INVENTION

The present invention in an illustrative embodiment provides an arithmetic unit which can perform two's complement or unsigned addition or subtraction without requiring the input operands to be in the same format as the result, and without requiring the computation of guard bits before overflow detection can begin.

In accordance with one aspect of the invention, an arithmetic unit is operative to perform an arithmetic operation on at least first and second input operands. Each of the input operands is separable into a first portion and a second portion, such as respective less significant and more significant portions. The arithmetic unit comprises first arithmetic circuitry, second arithmetic circuitry, selection circuitry and saturation circuitry. The first arithmetic circuitry, which may comprise a carry-propagate adder, processes the first portions of the input operands to generate at least a temporary sum and a carry output. The second arithmetic circuitry, which may comprise a dual adder and a preliminary saturation detector, processes the second portions of the input operands to generate one or more temporary sums and a number of saturation flags. The selection circuitry is configured to select one or more of the outputs of the second arithmetic circuitry based on the carry output of the first arithmetic circuitry. The saturation circuitry has inputs coupled to corresponding outputs of the first arithmetic circuitry and the selection circuitry, and is configured to generate a result of the arithmetic operation.

In an illustrative embodiment, each of the input operands comprises n bits, with k bits for the less significant portion and n−k bits for the more significant portion. More specifically, the input operands are in a mixed-number format, with the more significant portion of a given operand containing at least g guard bits and a sign bit, where n−k≧g+1.

The first arithmetic circuitry in the illustrative embodiment comprises a k-bit carry-propagate adder which receives as inputs less significant portions A[k−1:0] and B[k−1:0] of respective input operands A and B, and computes a temporary sum, T[k−1:0], and a carry output C[k].

The second arithmetic circuitry in the illustrative embodiment comprises an (n−k+1)-bit dual adder which receives as inputs more significant portions A[n−1:k] and B[n−1:k] of respective input operands A and B. The dual adder computes temporary sums T_0[n:k−1] and T_1[n:k−1], which are applied as inputs to a preliminary saturation detection portion of the second arithmetic circuitry. The preliminary saturation detection portion computes a number of saturation flags, such as positive saturation flags Sat+_0 and Sat+_1, and/or negative saturation flags Sat−_0 and Sat−_1.

The selection circuitry in the illustrative embodiment comprises a multiplexer which receives at a control input the carry output C[k] from the carry-propagate adder of the first arithmetic circuitry, and receives at a plurality of selectable inputs one or more of the saturation flags and temporary sums generated by the second arithmetic circuitry. The multiplexer is operative: (i) to output a temporary sum T[n−1:k]=T_0[n−1:k], and at least one of a positive saturation bit Sat+=Sat+_0 and a negative saturation bit Sat−=Sat−_0, when the carry output C[k]=0; and (ii) to output a temporary sum T[n−1:k]=T_1[n−1:k], and at least one of a positive saturation bit Sat+=Sat+_1 and a negative saturation bit Sat−=Sat−_1, when the carry output C[k]=1.

The saturation circuitry in the illustrative embodiment determines if the result of the arithmetic operation should be saturated based on one or more saturation bits supplied thereto by the selection circuitry. For example, if a received positive saturation bit Sat+=1, the saturation circuitry determines that positive overflow has occurred and saturates the result of the arithmetic operation to a most positive representable number of a designated number format. Similarly, if a received negative saturation bit Sat−=1, the saturation circuitry determines that negative overflow has occurred and saturates the result of the arithmetic operation to a most negative representable number of a designated number format.

In accordance with another aspect of the invention, an arithmetic unit may be configured to provide controllable selection between at least a first type of arithmetic operation with saturation and a second type of arithmetic operation without saturation, responsive to an applied control signal.

In accordance with a further aspect of the invention, an arithmetic unit may be configured to provide controllable selection between performance of an addition operation and performance of a subtraction operation, responsive to an applied control signal.

BRIEF DESCRIPTION OF THE DRAWINGS

FIG. 1 is a diagram illustrating conventional mixed number, fractional and sign-extended fractional number formats.

FIG. 2 shows three examples of conventional two's complement saturating addition with different input operand and result formats.

FIG. 3 is a schematic diagram of an illustrative embodiment of an arithmetic unit configured to perform two's complement addition with preliminary saturation detection in accordance with the invention.

FIG. 4 shows signal values generated by the FIG. 3 arithmetic unit in performing the exemplary two's complement saturating addition operations of FIG. 2.

DETAILED DESCRIPTION OF THE INVENTION

Figure 5:
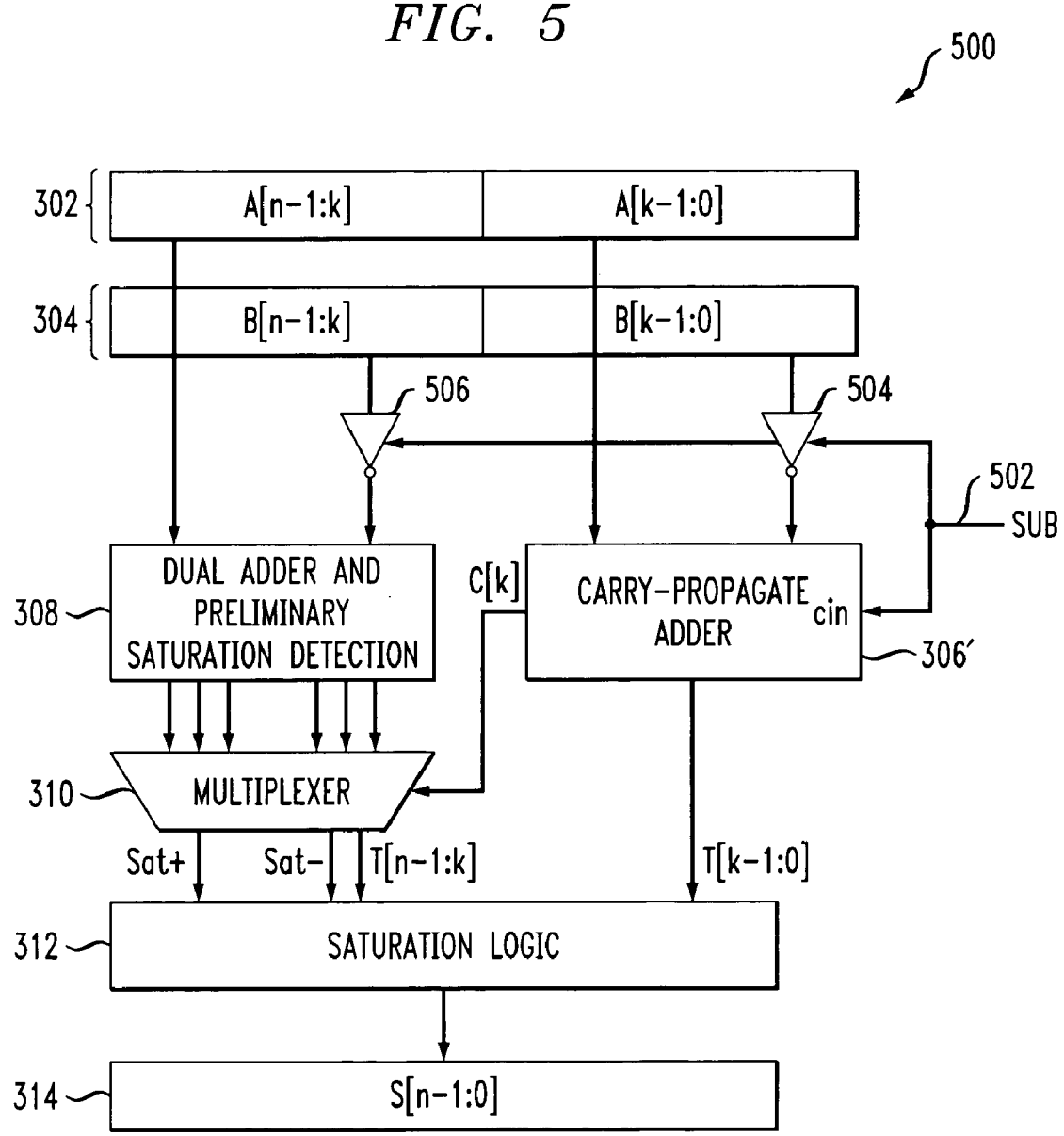
FIG. 5 is a schematic diagram of an illustrative embodiment of an arithmetic unit that is controllable to perform addition or subtraction in accordance with the invention.

The present invention will be described below in the context of a number of exemplary arithmetic units and associated processing operations. It should be understood, however, that the invention does not require the particular arrangements shown, and can be implemented using other types of processing circuitry.

A given arithmetic unit as described herein may be implemented as a portion of an integrated circuit. For example, the arithmetic unit may comprise an element of a digital data processor that is implemented as one or more integrated circuits.

FIG. 3 shows an arithmetic unit 300 in accordance with an illustrative embodiment of the invention. The arithmetic unit 300 in this embodiment processes a pair of input operands A and B stored in respective registers 302 and 304. The two input operands, A and B, are divided into less significant portions 302L, 304L and more significant portions 302M, 204M. Each of the input operands is assumed to be n bits, with k bits for the less significant portion and n−k bits for the more significant portion. For this particular embodiment, it is assumed that the input operands are in mixed-number format, with the most significant portion of a given operand containing at least the g guard bits and the sign bit (i.e., n−k≧g+1). Of course, these and other assumptions referred to herein in the context of a given embodiment need not apply in other embodiments. For example, the input operands may be in a fractional format, a sign-extended fractional format, or other format.

The less significant portions, A[k−1:0] and B[k−1:0], are fed as inputs to a k-bit carry-propagate adder 306. The carry-propagate adder 306 is an example of what is more generally referred to herein as "first arithmetic circuitry." The carry-propagate adder 306 computes the temporary sum, T[k−1:0], and a carry-out bit, C[k], as $$\{C[k], T[k-1:0]\} = A[k-1:0] + B[k-1:0],$$

where $\{C, T\}$ indicates that C and T are concatenated and A[k−1:0] denotes the k least significant bits of A (i.e., A[0] to A[k−1]). At the same time, the more significant portions, A[n−1:k] and B[n−1:k], are sign-extended by one bit and fed as inputs to an (n−k+1)-bit dual adder and preliminary saturation detection element 308. Element 308 is an example of what is more generally referred to herein as "second arithmetic circuitry." The (n−k+1)-bit dual adder portion of element 308 computes the following two temporary sums:

$$T\_0[n:k-1] = \{A[n-1], A[n-1:k]\} + \{B[n-1], B[n-1:k]\}$$
(used when C[k]=0)

$$T\_1[n:k-1] = \{A[n-1], A[n-1:k]\} + \{B[n-1], B[n-1:k]\} +1 \text{ (used when } C[k]=1).$$

Thus, T_1[n:k−1] is always one more than T_0[n:k−1]. By sign-extending A[n−1:k] and B[n−1:k], the most significant bits of the temporary sums, T_0[n] and T_1[n], always contain the true sign for the result of the addition, and can be used to determine the correct direction for saturation.

The outputs of the dual adder portion of element 308, T_0[n:k−1] and T_1[n:k−1], are fed as inputs to the preliminary saturation detection portion of element 308, which computes the following saturation flags:

Sat+_0=not(T_0[n]) and (T_0[n−1] or T_0[n−2] or ... or T_0[n−g−1])

Sat+_1=not(T_1[n]) and (T_1[n−1] or T_1[n−2] or ... or T_1[n−g−1])

Sat−_0=T_0[n] and not(T_0[n−1] and T_0[n−2] and ... and T_0[n−g−1])

Sat−_1=T_1[n] and not(T_1[n−1] and T_1[n−2] and ... and T_1[n−g−1]), where g is the number of guard bits, and T_0[n−g−1] and T_1[n−g−1] are the sign bits of the temporary sums in sign-extended fractional format. Thus, the final result should be saturated to the most positive number if the most significant temporary sum bit, T_0[n] or T_1[n], is zero and any of the guard bits or sign bit are one. It should be saturated to the most negative number if the most significant temporary sum bit, T_0[n] or T_1[n], is one and any of the guard bits or the sign bit are zero. Otherwise, the final result should not be saturated.

The carry output C[k] from the carry-propagate adder 306 is applied as a select signal to a control input of multiplexer 310. Multiplexer 310 is an example of what is more generally referred to herein as "selection circuitry." The multiplexer 310 outputs T[n−1:k]=T_0[n−1:k], Sat+=Sat+_0, and Sat−=Sat−_0 when C[k]=0, and outputs T[n−1:k]=T_1[n−1:k], Sat+=Sat+_1, and Sat−=Sat−_1 when C[k]=1.

Saturation logic 312 is an example of what is more generally referred to herein as "saturation circuitry." The saturation logic 312 takes the temporary sum T[n−1:0] and the saturation bits, Sat+ and Sat−. If Sat+=1, positive overflow has occurred and the result should be saturated to the most positive representable number. If Sat−=1, negative overflow has occurred and the result should be saturated to the most negative representable number. Otherwise, overflow has not occurred and the correct result is T[n−1:0].

The result S[n−1:0] of the addition operation performed on input operands A and B is stored in register 314.

FIG. 4 shows signal values generated by the FIG. 3 arithmetic unit in performing the example addition operations of FIG. 2. In all three examples, n=8, f=4, and k=n−(g+1)=4. The value T_0[8:4] is used to calculate Sat+_0 and Sat−_0, while T_1[8:4] is used to calculate Sat+_1 and Sat−_1, using the equations for the saturation flags given previously.

In the first example, since C[4]=1, the values selected are $$T[8:4] = T\_1[8:4] = 00001, \text{Sat+} = \text{Sat+}\_1 = 1, \text{ and Sat−} = \text{Sat−}\_1 = 0.$$

Since Sat+=1, the sum is saturated to the most positive representable number.

In the second example, since C[4]=0, the values selected are $$T[8:4] = T\_0[8:4] = 11101, \text{Sat+} = \text{Sat+}\_0 = 0, \text{ and Sat−} = \text{Sat−}\_0 = 1.$$

Since Sat−=1, the sum is saturated to the most negative representable number.

In the third example, since C[4]=0, the values selected are $$T[8:4] = T\_0[8:4] = 11111, \text{Sat+} = \text{Sat+}\_0 = 0, \text{ and Sat−} = \text{Sat−}\_0 = 0.$$

Since Sat+=0 and Sat−=0, the sum is not saturated, so S[7:0]=T[7:0].

FIG. 5 illustrates a manner in which the FIG. 3 arithmetic unit can be adapted for controllable operation as either an adder or a subtractor. An arithmetic unit 500 in this embodiment comprises elements 302, 304, 308, 310, 312 and 314, all configured to operate substantially as previously described inconjunction with FIG. 3. The arithmetic unit 500 further comprises a carry-propagate adder 306' which operates in substantially the same manner as carry-propagate adder 306 of FIG. 3, but includes an additional input terminal for receiving a carry input cin.

A control signal sub applied to input 502 of arithmetic unit 500 controls whether addition or subtraction of the input operands A and B is performed. When sub is set to zero, the inverters 504 and 506 are disabled and the arithmetic unit 500 adds the input operands A and B as in FIG. 3. In order to perform subtraction, the sub control signal is set to one, which inverts the second input operand, B, and sets the carry input cin to one.

The inverters 504, 506 shown in this diagram may be implemented as multiple input conditional inverters, such that when sub is one they invert their inputs and when sub is zero they do not invert their inputs.

Figure 6:
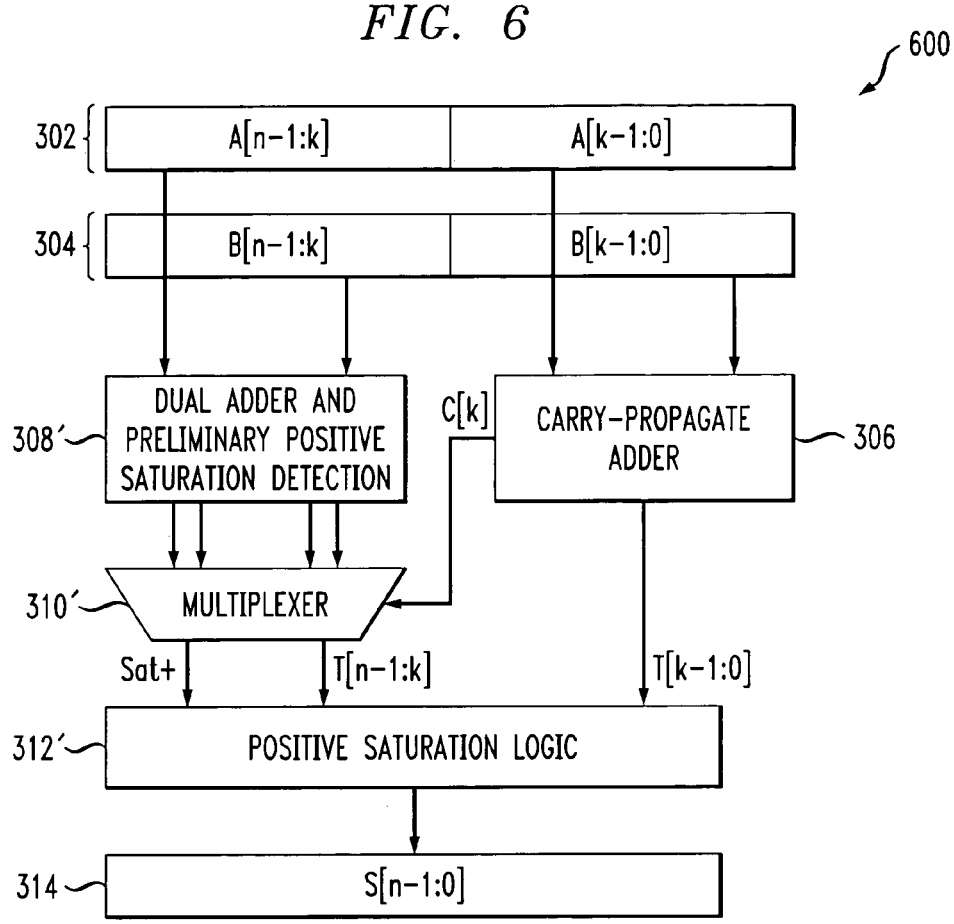
FIG. 6 is a schematic diagram of an illustrative embodiment of an arithmetic unit configured to perform unsigned addition in accordance with the invention.

FIG. 6 illustrates a manner in which an arithmetic unit of the type shown in FIG. 3 can be adapted for use in unsigned addition. An arithmetic unit 600 in this embodiment comprises elements 302, 304, 306 and 314, all configured to operate substantially as previously described in conjunction with FIG. 3. The arithmetic unit 600 further includes modified elements 308', 310' and 312', which operate substantially as described in conjunction with FIG. 3, but with straightforward modification to support unsigned addition.

In the case of unsigned addition, if any of the guard bits are one, overflow occurs and the result is saturated to the largest representable number. Negative overflow cannot occur for unsigned addition, so the previously-described equations for Sat−_0 and Sat−_1 are not needed. Thus, a preliminary positive saturation detection portion of element 308' is configured to compute only positive saturation flags, as follows:

Sat+_0=$T\_0[n]$ or $T\_0[n-1]$ or $T\_0[n-2]$ or . . . or $T\_0[n-g]$

Sat+_1=$T\_1[n]$ or $T\_1[n-1]$ or $T\_1[n-2]$ or . . . or $T\_1[n-g]$

Similarly, the saturation logic 312' need only handle positive saturation for unsigned numbers. As a result, the modified multiplexer 310' has only four inputs and two outputs, instead of six inputs and three outputs.

It will be apparent to those skilled in the art that a given arithmetic unit in accordance with the invention can be configured for selectable performance of either two's complement or unsigned arithmetic.

Also, the FIG. 6 arithmetic unit can be configured in a manner similar to that described in conjunction with FIG. 5 so as to perform addition or subtraction.

Figure 7:
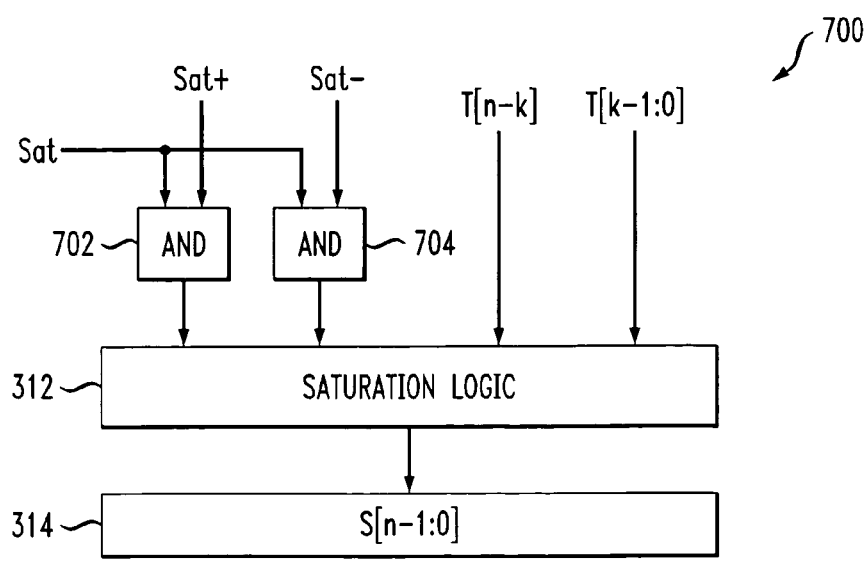
FIG. 7 shows an example of one possible technique for configuring an arithmetic unit of the type shown in FIG. 3 or FIG. 5 so as to permit controllable selection of saturating or wrap-around arithmetic.

FIG. 7 illustrates a manner in which an arithmetic unit such as that of FIG. 3 or FIG. 5 can be adapted for controllable selection of either saturating or wrap-around arithmetic. With wrap-around arithmetic, when overflow occurs any unused bits that do not fit in the specified format are simply discarded (i.e., the result is not saturated). Thus, to perform wrap-around arithmetic, the arithmetic unit 700 is modified so that T[n−1:0] is always selected by the saturation logic 312.

This is accomplished in the FIG. 7 embodiment by performing a logical AND of each of the saturation signals, Sat+ and Sat−, with a control signal, sat, using respective AND gates 702 and 704. The control signal sat is one when saturating addition is to be performed and zero when wrap-around addition is to be performed. Thus, when sat=1, the outputs of both AND gates are zero, so that T[n−1:0] is selected, which corresponds to wrap-around addition. When sat is one, the values for Sat+ and Sat− pass through the AND gates unchanged, which corresponds to saturating addition.

A similar modification can be made to the FIG. 6 arrangement, so as to permit controllable selection of saturating or wrap-around arithmetic in that embodiment.

As indicated previously, the present invention can be advantageously implemented in a digital data processor. A more particular example of such a processor is a multi-threaded processor of the type described in U.S. patent application Ser. No. 10/269,372, filed Oct. 11, 2002 and entitled "Multithreaded Processor With Efficient Processing For Convergence Device Applications," which is commonly assigned herewith and incorporated by reference herein.

The present invention in the illustrative embodiments described above provides a number of significant advantages relative to conventional techniques.

For example, the described embodiments can perform operations on operands in the mixed-number format and produce saturated results that are in the fractional format or sign-extended fractional format. Thus, the arithmetic units do not require the input operands to be in the same format as the result. Moreover, these arithmetic units do not require computation of guard bits before overflow detection can begin.

Furthermore, since digital signal processing and multimedia applications may require the functionality of saturating arithmetic and wrap-around arithmetic, a significant reduction in cost is achievable using an arithmetic unit that performs either saturating or wrap-around arithmetic based on a control input, as described above.

It should be noted that the particular circuitry arrangements shown in FIGS. 3, 5, 6 and 7 are presented by way of illustrative example only, and additional or alternative elements not explicitly shown may be included, as will be apparent to those skilled in the art. For example, those skilled in the art will recognize that numerous alternative arrangements of first and second arithmetic circuitry, selection circuitry and saturation circuitry may be used in implementing the present invention. Also, different single or multi-bit carry outputs may be used, as well as different temporary sums, saturation flags, saturation bits, control signals or other signals, in any combination.

It should also be emphasized that the present invention does not require the particular arithmetic operations described above. Other types of arithmetic operations and associated number formats may be utilized.

Thus, the above-described embodiments of the invention are intended to be illustrative only, and numerous alternative embodiments within the scope of the appended claims will be apparent to those skilled in the art.

What is claimed is:

1. An arithmetic unit for performing an arithmetic operation on at least first and second input operands, each of the input operands being separable into a first portion and a second portion, the arithmetic unit comprising:

first arithmetic circuitry configured to process the first portions of the input operands;

second arithmetic circuitry configured to process the second portions of the input operands, the second arithmetic circuitry being further configured to perform preliminary saturation detection utilizing one or more temporary sums computed therein from the second portions of the input operands;

selection circuitry configured to select one or more of a plurality of outputs of the second arithmetic circuitry based on a carry output of the first arithmetic circuitry; and saturation circuitry having inputs coupled to corresponding outputs of the first arithmetic circuitry and the selection circuitry, the saturation circuitry being configured to generate a result of the arithmetic operation.

2. The arithmetic unit of claim 1 wherein the arithmetic operation comprises one of an addition operation and a subtraction operation.

3. The arithmetic unit of claim 1 wherein the first and second portions of a given one of the input operands comprise respective more significant and less significant portions of the given input operand.

4. The arithmetic unit of claim 3 wherein each of the input operands comprises n bits, with k bits for the less significant portion and n−k bits for the more significant portion.

5. The arithmetic unit of claim 4 wherein the input operands are in a mixed-number format, with the more significant portion of a given operand containing at least g guard bits and a sign bit, where $n-k \geq g+1$.

6. The arithmetic unit of claim 5 wherein the first arithmetic circuitry comprises a k-bit carry-propagate adder which receives as inputs less significant portions A[k−1:0] and B[k−1:0] of respective input operands A and B.

7. The arithmetic unit of claim 6 wherein the carry-propagate adder computes a temporary T[k−1:0], and carry output, C[k], as $$\{C[k], T[k-1:0]\}=A[k-1:0]+B[k-1:0],$$

where {C,T} indicates that C and T are concatenated.

8. The arithmetic unit of claim 5 wherein the second arithmetic circuitry comprises an (n−k+1)-bit dual adder which receives as inputs more significant portions A[n−1:k] and B[n−1:k] of respective input operands A and B, and which is configured to compute at least two temporary sums.

9. The arithmetic unit of claim 8 wherein the dual adder computes the following two temporary sums:

$$T\_0[n:k-1]=\{A[n-1],A[n-1:k]\}+\{B[n-1],-B[n-1:k]\}$$

$$T\_1[n:k-1]=\{A[n-1],A[n-1:k]\}+\{B[n-1],B[n-1:k]\}+1.$$

10. The arithmetic unit of claim 8 wherein the two temporary sums computed by the dual adder are applied as inputs to a preliminary saturation detection portion of the second arithmetic circuitry, which computes at least a subset of the following saturation flags: Sat+_0, Sat+_1, Sat−_0 and Sat−_1.

11. The arithmetic unit of claim 10 wherein the saturation flags Sat+_0, Sat+_1, Sat−_0 and Sat−_1 are computed as follows:

Sat+_0=not($T\_0[n]$) and ($T\_0[n-1]$ or $T\_0[n-2]$ or ... or $T\_0[n-g-1]$)

Sat+_1=not($T\_1[n]$) and ($T\_1[n-1]$ or $T\_1[n-2]$ or ... or $T\_1[n-g-1]$)

Sat−_0=$T\_0[n]$ and not($T\_0[n-1]$) and $T\_0[n-2]$ and ... and $T\_0[n-g-1]$)

Sat−_1=$T\_1[n]$ and not($T\_1[n-1]$) and $T\_1[n-2]$ and ... and $T\_1[n-g-1]$).

12. The arithmetic unit of claim 10 wherein the saturation flags Sat+0 and Sat+1 are computed as follows:

Sat+_0=$T\_0[n]$ or $T\_0[n-1]$ or $T\_0[n-2]$ or ... or $T\_0[n-g]$

Sat+_1=$T\_1[n]$ or $T\_1[n-1]$ or $T\_1[n-2]$ or ... or $T\_1[n-g]$.

13. The arithmetic unit of claim 10 wherein the selection circuitry comprises a multiplexer which receives at a control input a carry output C[k] from a carry-propagate adder of the first arithmetic circuitry, and receives at a plurality of selectable inputs one or more of the saturation flags and temporary sums generated by the second arithmetic circuitry.

14. The arithmetic unit of claim 13 wherein the multiplexer is operative:

(i) to output a temporary sum T[n−1:k]=T_0[n−1:k], and at least one of a positive saturation bit Sat+=Sat+_0 and a negative saturation bit Sat−=Sat−_0, when the carry output C[k]=0; and (ii) to output a temporary sum T[n−1:k]=T_1[n−1:k], and at least one of a Positive saturation bit Sat+=Sat+_1 and a negative saturation bit Sat−=Sat−_1, when the carry output C[k]=1.

15. The arithmetic unit of claim 1 wherein the first arithmetic circuitry comprises a carry-propagate adder.

16. The arithmetic unit of claim 1 wherein the second arithmetic circuitry comprises a dual adder portion and a preliminary saturation detection portion.

17. The arithmetic unit of claim 1 wherein the selection circuitry comprises a multiplexer.

18. The arithmetic unit of claim 1 wherein the saturation circuitry determines if the result of the arithmetic operation should be saturated based on one or more saturation bits supplied thereto by the selection circuitry.

19. The arithmetic unit of claim 18 wherein if a received positive saturation bit Sat+=1, the saturation circuitry determines that positive overflow has occurred and saturates the result of the arithmetic operation to a most positive representable number of a designated number format 20. The arithmetic unit of claim 18 wherein if a received negative saturation bit Sat−=1, the saturation circuitry determines that negative overflow has occurred and saturates the result of the arithmetic operation to a most negative representable number of a designated number format 21. The arithmetic unit of claim 1 wherein the arithmetic unit is configured to provide controllable selection between at least a first type of arithmetic operation with saturation and a second type of arithmetic operation without saturation, responsive to an applied control signal.

22. The arithmetic unit of claim 1 wherein the arithmetic unit is configured to provide controllable selection between performance of an addition operation and performance of a subtraction operation, responsive to an applied control signal.

23. The arithmetic unit of claim 1 wherein the arithmetic unit is configured to provide controllable selection between at least a two's complement arithmetic operation and an unsigned arithmetic operation, responsive to an applied control signal.

24. In a processor, a method for performing an arithmetic operation on at least first and second input operands, each of the input operands being separable into a first portion and a second portion, the method comprising the steps of:

processing the first portions of the input operands in first arithmetic circuitry;

processing the second portions of the input operands in second arithmetic circuitry, the second arithmetic circuitry being configured to perform preliminary saturation detection utilizing one or more temporary sums computed therein from the second portions of the input operands;

generating a result of the arithmetic operation in saturation circuitry coupled to the first arithmetic circuitry and the second arithmetic circuitry;

wherein one or more of a plurality of outputs of the second arithmetic circuitry are selected for application to the saturation circuitry, responsive to a carry output of the first arithmetic circuitry 25. An integrated circuit comprising:

a plurality of arithmetic units;

at least one of the arithmetic unit configured to perform an arithmetic operation on at least first and second input operands, each of the input operands being separable into a first portion and a second portion, the arithmetic unit comprising:

first arithmetic circuitry configured to process the first portions of the input operands;

second arithmetic circuitry configured to process the second portions of the input operands, the second arithmetic circuitry being further configured to perform preliminary saturation detection utilizing one or more temporary sums computed therein from the second portions of the input operands;

selection circuitry configured to select one or more of a plurality of outputs of the second arithmetic circuitry based on a carry output of the first arithmetic circuitry; and saturation circuitry having inputs coupled to corresponding outputs of the first arithmetic circuitry and the selection circuitry, the saturation circuitry being configured to generate a result of the arithmetic operation.

* * * * *